United States Patent
Tebbe et al.

(10) Patent No.: US 12,358,649 B1
(45) Date of Patent: Jul. 15, 2025

(54) EXTENSIBLE BOOM DEVICE

(71) Applicant: AMAZON TECHNOLOGIES, INC., Seattle, WA (US)

(72) Inventors: Kevin Tebbe, Fairfax, VA (US); Michael Joseph Dergance, Redmond, WA (US); Keith Miller, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 705 days.

(21) Appl. No.: 17/457,796

(22) Filed: Dec. 6, 2021

(51) Int. Cl.
| | |
|---|---|
| B64G 1/22 | (2006.01) |
| B64G 1/10 | (2006.01) |
| B64G 1/44 | (2006.01) |
| B64G 1/66 | (2006.01) |
| F16B 7/10 | (2006.01) |
| H02S 30/20 | (2014.01) |

(52) U.S. Cl.
CPC ......... B64G 1/2226 (2023.08); B64G 1/1007 (2013.01); B64G 1/443 (2013.01); B64G 1/66 (2013.01); F16B 7/10 (2013.01); H02S 30/20 (2014.12)

(58) Field of Classification Search
CPC .... B64G 1/2226; B64G 1/222; B64G 1/2221; F16B 7/10; F16B 7/14; F16B 7/1436; H02S 30/20; H02S 20/30
See application file for complete search history.

(56) References Cited

U.S. PATENT DOCUMENTS

| | | | | |
|---|---|---|---|---|
| 4,062,156 | A * | 12/1977 | Roth | F16B 7/105 343/903 |
| 4,793,197 | A * | 12/1988 | Petrovsky | F16H 25/20 248/161 |
| 5,315,795 | A * | 5/1994 | Chae | E04H 12/185 343/901 |
| 5,848,554 | A * | 12/1998 | Kober | B60S 9/08 254/102 |
| 10,119,292 | B1 * | 11/2018 | Harvey | E04H 12/18 |

(Continued)

OTHER PUBLICATIONS

FR-2929593 and merged English translation (Year: 2009).*

(Continued)

*Primary Examiner* — Peter M Poon
*Assistant Examiner* — Marisa V Conlon
(74) *Attorney, Agent, or Firm* — Lindauer Law, PLLC

(57) ABSTRACT

A telescopic boom system provides an extensible boom that may be used in spacecraft applications including supporting photovoltaic panels, communication antennas, instrumentation, and so forth. A stowed configuration is volumetrically compact, including the boom and actuators such as a motor. During deployment, threaded nuts for each nested section of the boom are self-aligning with respect to a leadscrew driven by the motor. Sections are staged for extension in staged sequence by a flexure arm engaging a ramp feature on a portion of the nested section. Extension failure mitigation is enhanced by allowing partial retraction of some sections during extension. Once fully extended, tension of the boom may be later adjusted, modifying the structural fundamental frequency. A ratchet may be engaged with extension of a final nested section to prevent retraction of the extended boom.

20 Claims, 10 Drawing Sheets

(56) References Cited

U.S. PATENT DOCUMENTS

| | | | | |
|---|---|---|---|---|
| 11,444,571 | B2* | 9/2022 | Eskenazi | H02S 30/20 |
| 11,724,920 | B2* | 8/2023 | Butler | B64G 1/2226 |
| | | | | 212/292 |
| 12,116,149 | B2* | 10/2024 | Pupille | B64G 1/222 |
| 2009/0145056 | A1* | 6/2009 | Pereira | E04H 12/182 |
| | | | | 52/111 |

OTHER PUBLICATIONS

Bourrec, et al., "Telescopic Boom for Space Applications Engineering Model", 14th European Space Mechanisms & Tribology Symposium—ESMATS 2011, Sep. 2011, 6 pgs. Retrieved from the Internet: URL: https://www.esmats.eu/esmatspapers/pastpapers/pdfs/2011/bourrec.pdf.

Humphries, et al., "The Design and Development of a Multi Element Telescopic Boom (Known as the Sula Boom)", 12th Euro. Space Mechanisms & Tribology Symp. (ESMATS), Aug. 2007, 8 pgs. Retrieved from the Internet: URL: https://esmats.eu/esmatspapers/pastpapers/pdfs/2007/humphrie.pdf.

Shah, K.P., "Fundamentals of Threaded Fasteners", Practical Maintenance, Sep. 2019, 64 pgs. Retrieved from the Internet: URL: https://practicalmaintenance.net/wp-content/uploads/Fundamentals-of-Threaded-Fasteners.pdf.

Shore, et al., "A New Generation of Deployable Optics for Earth Observation Using Small Satellites", European Space Mechanisms and Tribology Symposium 2019, Sep. 2019, 8 pgs. Retrieved from the Internet: URL: https://esmats.eu/esmatspapers/pastpapers/pdfs/2019/shore.pdf.

* cited by examiner

EXTENSIBLE BOOM DEVICE

BACKGROUND

Spacecraft provide a wide variety of useful functions, such as providing communication services. Some spacecraft components may be supported, with respect to the spacecraft, by a structure. For example, a spacecraft photovoltaic array may be held in a deployed configuration by a boom.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1A:
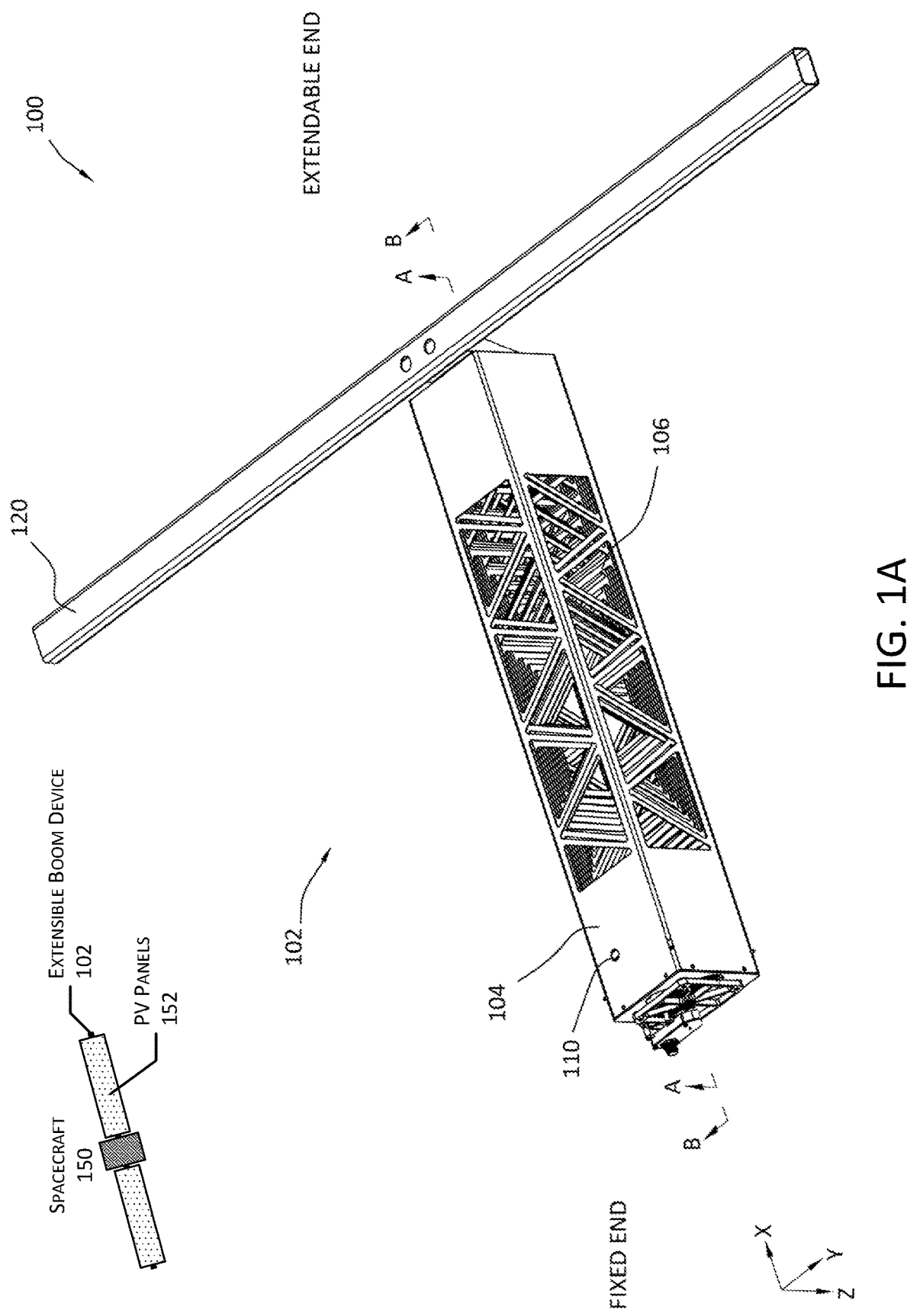
FIG. 1A illustrates a stowed configuration of an extensible boom device, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Spacecraft provide a variety of useful functions including exploration, remote sensing, providing communication services, and so forth. Spacecraft may be launched in a stowed configuration that takes up less overall volume than their final extended or unstowed configuration during operation. For example, a photovoltaic (PV) device (also referred to as a "solar panel") converts light into electricity. To provide sufficient electricity for operation of the spacecraft, a set of PV panels may be used. During launch, these panels may be folded to fit within the launch vehicle. After launch, these panels may be unfolded to maximize their exposure to sunlight. In some implementations, an extensible boom may be used to unfold and subsequently support the panels, maintaining them in the desired shape by providing tension. For example, one end of the set of panels is attached to the main body of the spacecraft while the other end is attached to the end of the boom. The end of the boom "pulls" on the set of panels, keeping them under tension and maintaining the desired shape.

In other implementations, other devices may need to be supported at a distance from a main body or "bus" of the spacecraft. For example, a sensor such as an ion detector or magnetometer may be held at some distance away from the spacecraft to allow sensitive measurements to be made. In another example, a radiator may be extended and supported to allow waste heat to be radiated into space. In yet another example, a sunshade may be extended and supported to shield a part of the spacecraft.

Physical structures, such as the bus of the spacecraft and an extended boom, exhibit a fundamental frequency at which they resonate. The fundamental frequency of a structure determines how that structure will vibrate. Spacecraft, operating in a microgravity environment in a vacuum may exhibit a variety of undesirable behaviors due to vibration. For example, firing a thruster on the spacecraft may have a similar effect to a finger plucking a guitar string, causing the spacecraft to vibrate. Other phenomena can also induce vibrations in the spacecraft, such as operation of motors, heating due to sunlight, cooling while in shadow, micrometeoroid impacts, asymmetric aerodynamic drag, and so forth. Such vibrations may cause undesirable effects, such as changing where a sensor or antenna is pointing, causing mechanical stress that could lead to damage, and so forth.

Many factors determine the fundamental frequency of a structure, including the mass, rigidity, and so forth. For example, a solid steel bar will have a high fundamental frequency while a long plastic pipe will have a low fundamental frequency. In most situations, structures having higher fundamental frequencies are preferred on spacecraft. For example, this helps minimize relatively large physical displacement or movement due to vibration at resonance.

Spacecraft are often constrained by their mass. For example, launch vehicles have a limit on how heavy a spacecraft they can lift. As a result, it is preferred to make a spacecraft with the lowest mass possible. This not only improves options for launch, but also provides improved operational lifetime. For example, a spacecraft with a mass of 100 kilograms uses less fuel to perform a given maneuver than a spacecraft with a mass of 200 kg. With this in mind, spacecraft are designed to have the least mass possible. However, this introduces many design challenges, including affecting the fundamental frequency of the spacecraft when extended. Continuing the earlier example, a PV panel that is supported by the solid steel bar will have a higher fundamental frequency than a PV panel that is supported by the long plastic pipe. The solid steel bar is too massive and it may be too large to fit within the volume available in the launch vehicle. The long plastic pipe is inadequate due to the resulting low fundamental frequency. In implementations where the PV panel or other device is maintained under tension using a boom, the situation becomes more complex and less favorable.

Traditional systems have used various schemes to deploy PV panels or other devices such as deploying optical telescope elements to a required physical position. However, these traditional systems have exhibited various drawbacks. For example, devices having high rigidity and thus higher fundamental frequencies have traditionally involved more massive parts, increase parts count, and complex deployment requiring many operations. Similarly, lower mass devices exhibit high fundamental frequencies. While those high fundamental frequencies may have been acceptable in more primitive spacecraft, they are unacceptable in many current and expected spacecraft designs.

Described in this disclosure is an extensible boom device for use in a spacecraft. The extensible boom device may be used to support components such as one or more PV panels, radiators, sensors, sunshades, and so forth. The extensible boom device is volumetrically compact, allowing it to fit into a very small space within the spacecraft during launch. The extensible boom device is low mass while providing a relatively high fundamental frequency. The extensible boom device is also able to be operated after extension, permitting further extension to apply tension and modify the fundamental frequency of the structure. During extension, the extensible boom device provides a "staged" extension, with one nested section being extended at a time. During most stages of extension, the travel of the extensible boom may be partially reversed. This allows additional options to recover from a mechanical fault such as undesired binding, premature staging in which more than one nested section 106 is extended at the same time, and so forth.

The extensible boom device comprises a fixed section and one or more nested sections. As a nested section reaches the end of its travel during extension, locking pins engage, holding the relative position relative to a surrounding section. In this fashion, the sections extend in telescoping and staged (one-section-at-a-time) fashion.

Movement of the nested sections is provided by one or more motors driving a leadscrew. The leadscrew has an unthreaded portion and a threaded portion. Each nested section has a support structure. Each nested section has a threaded feature, such as a nut, that is configured to engage the threaded portion of the leadscrew. In some implementations, the support structure may appear to be "X" shaped when viewed end-on, with a threaded nut in the center of the "X". The support structure operates as a reaction plate to accept the force provided by the threaded nut interacting with the threaded portion of the leadscrew.

In some implementations, one or more of the support structures may have a spring or other biasing mechanism to bias the threaded portion towards the threaded portion of the leadscrew. For example, a wave spring may be used to urge the nut towards the threaded portion of the leadscrew. The biasing mechanism improves engagement as the threaded portion of the support structure engages the threaded portion of the leadscrew.

The threaded portions of the nested sections may be "clocked" or offset with respect to the start, or "lead-in" of their respective threads. For example, the innermost section may have a nut with thread lead-in starting at 12 o'clock, while a next-outermost section has a nut with lead-in starting at 2 o'clock, and so forth. This "clocking" or successive angular offset of the lead-ins of the threaded portion facilitates the staged extension.

A flexure arm has a free end that comes into contact with a portion of the support structure for each nested section. An innermost nested section, that is first to be deployed, may have a flat profile of this support structure. A next-innermost nested section and subsequent sections may have a ramped profile on their respective support structures. As a support structure moves during extension, this ramp profile comes into contact with the free end of the flexure arm. The flexure arm provides a force on the ramp, facilitating the staged extension. Once past the "bump" in the ramp, the flexure arm provides a force to urge the support structure towards the threaded portion of a leadscrew.

A stage clip may be used to prevent a last-out nested section from moving until driven by the leadscrew, preventing the pawl and ratchet from prematurely engaging in implementations with the pawl and ratchet. For example, the stage clip may engage a portion of a ramp of the last-out nested section, biasing the last-out nested section to remain in place until pulled by a preceding nested section. One end of the stage clip may be affixed to the fixed section.

The extensible boom device may incorporate other features. A load retention clip may be used to maintain at least some of the panels in a stowed or stacked configuration until released by movement of a nested section. As the nested section moves, it withdraws a load retention clip release pin, freeing the load retention clip and releasing the panels held by the load retention clip.

A ratchet mechanism may be engaged once extension of the last-out nested section. The ratchet may limit rotation of the leadscrew to a single direction to prevent inadvertent reversal of the extension. This allows the motor to increase tension, while preventing inadvertent motion that would decrease tension.

The volume used by the extensible boom device may be further decreased by placing the motor(s) that drive the leadscrew inside the fixed section in some implementations. While stowed in this implementation, the motor is within the fixed section and nested sections. Once extended, the motor remains within the fixed section. As mentioned above, at a later time the motor may be operated to rotate the leadscrew. This allows the tension on the extensible boom to be modified at a later date. For example, at a later time the motor may rotate the leadscrew to further extend the nested section that remains engaged with the leadscrew.

By using the extensible boom device described in this disclosure, a volumetrically compact, low mass extensible boom is provided for spacecraft use. The system incorporates various features that improve fault resolution, reduce production cost, improve operational lifespan, and so forth. As a result, the extensible boom device may be readily deployed for use in spacecraft such as large constellations of communication spacecraft.

Illustrative System

FIG. 1A illustrates at 100 a stowed configuration of an extensible boom device 102, according to some implementations. A spacecraft 150 may use the extensible boom device 102 to deploy and support a load, such as an array of photovoltaic (PV) panels 152, communication antennas, and so forth. For example, the array of PV panels (panels) 152 may be a set of rigid panels joined with hinges to provide an accordion fold. While stowed, the panels 152 form a compact stack. A far end of the set of rigid panels may be affixed to a far end of the extensible boom device 102, while a near end of the set of rigid panels may be affixed to the body of the spacecraft 150. As the extensible boom device 102 extends, the panels 152 are extended as well. After extension, the extensible boom device 102 may provide tension that maintains the panels 152 in the extended configuration.

The spacecraft 150 may be one of a plurality (or "constellation") of spacecraft 150(1), 150(2), . . . , 150(S). The constellation may comprise hundreds or thousands of spacecraft 150, in various orbits. For example, one or more of the spacecraft 150 may be in non-geosynchronous orbits (NGOs) in which they are in constant motion with respect to the Earth, such as a low earth orbit (LEO).

The extensible boom device (EBD) 102 comprises a fixed section 104 and one or more nested sections 106(1), 106(2), . . . , 106(N). In some implementations, the EBD 102 may also comprise one or more of a gear assembly 108, load retention clip aperture 110, a load arm 120, or other elements.

The fixed section 104 may be affixed to a bus or frame of the spacecraft 150. The one or more nested sections 106 are at least partially within the fixed section 104 before extension.

In this disclosure, the fixed section 104 and the nested section(s) 106 are depicted as being rectangular in cross section and comprising a truss arrangement. In other implementations other cross sections may be used. For example, circular cross sections, triangular cross sections, hexagonal cross sections, and so forth may be used. One or more of the fixed section 104 or the nested section(s) 106 may be solid or may have lightening holes or other features such as other truss arrangements.

The gear assembly 108 may comprise one or more gears, a ratchet mechanism, rotation sensors, and so forth. In some implementations the gear assembly 108 may be omitted and a motor may directly drive the leadscrew.

The load retention clip aperture 110 provides an opening through which a portion of a load retention clip may pass. The load retention clip is discussed with regard to FIG. 7.

Figure 1B:
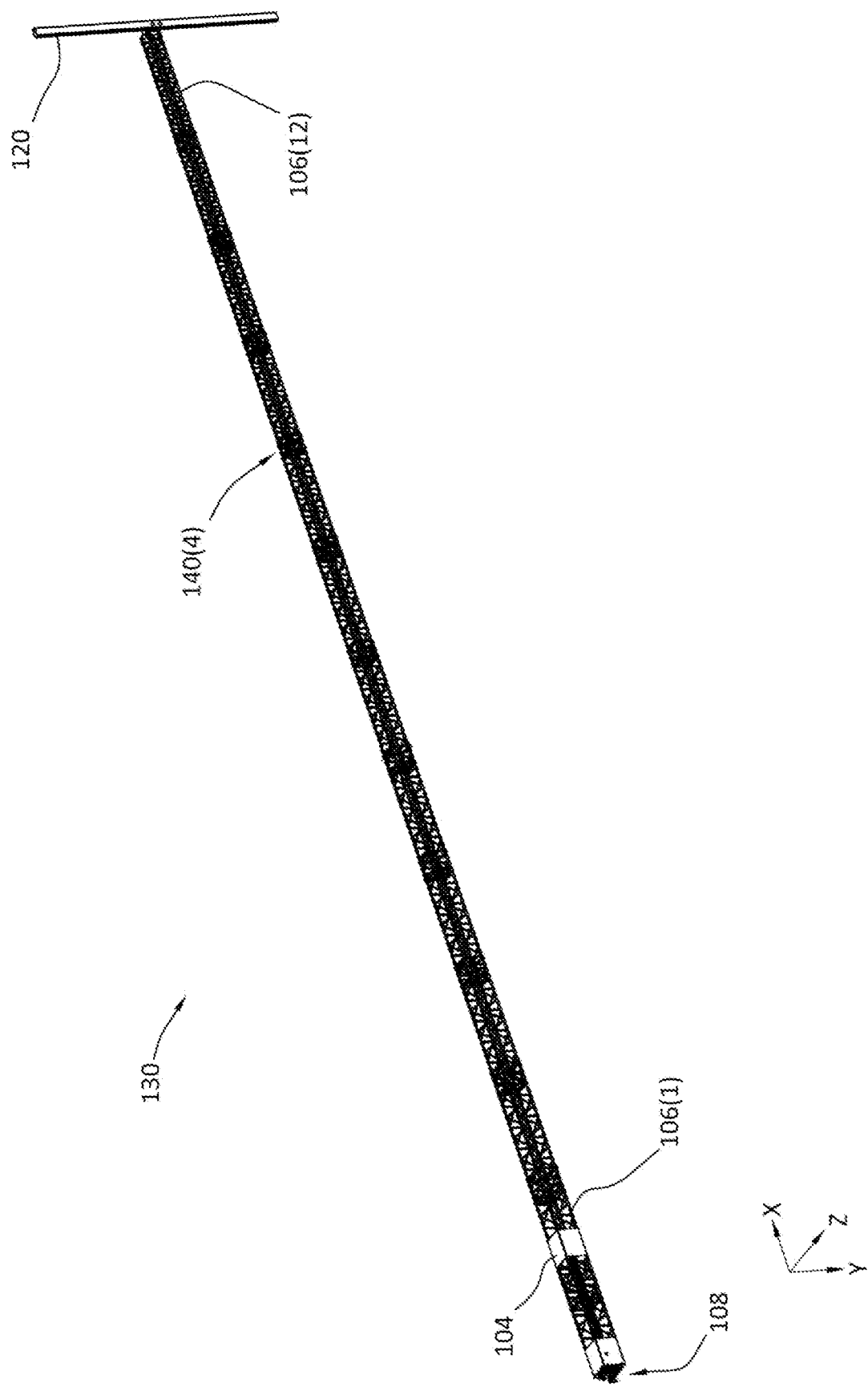
FIG. 1B illustrates an extended configuration of the extensible boom device, according to some implementations.

FIG. 1B illustrates at 130 an extended or deployed configuration of the extensible boom device 102, according to some implementations. The fixed section 104 and gear assembly 108 are shown. Extending from the fixed section 104 are twelve (12) nested sections 106(1)-106(12). Twelve nested sections 106(1)-(12) are shown by way of illustration and not necessarily as a limitation. In other implementations, more or fewer nested sections 106 may be used. In this and the following figures, the first nested section 106(1) comprises the nested section 106 that is immediately within the fixed section 104. This continues, with the twelfth nested section 106(12) comprising the nested section 106 to which the load arm 120 is affixed.

In the extended configuration shown here, the nested sections 106 exhibit some section overlap 140. The section overlap 140 facilitates load transfer between the overlapping sections.

The extension of the EBD 102 is staged in that one nested section 106 will be extended at a time in progressive fashion. For example, the twelfth nested section 106(12) is the first section extended, the eleventh nested section 106(11) is the second section extended, and so forth, with the first nested section 106(1) being the last section extended.

Figure 2:
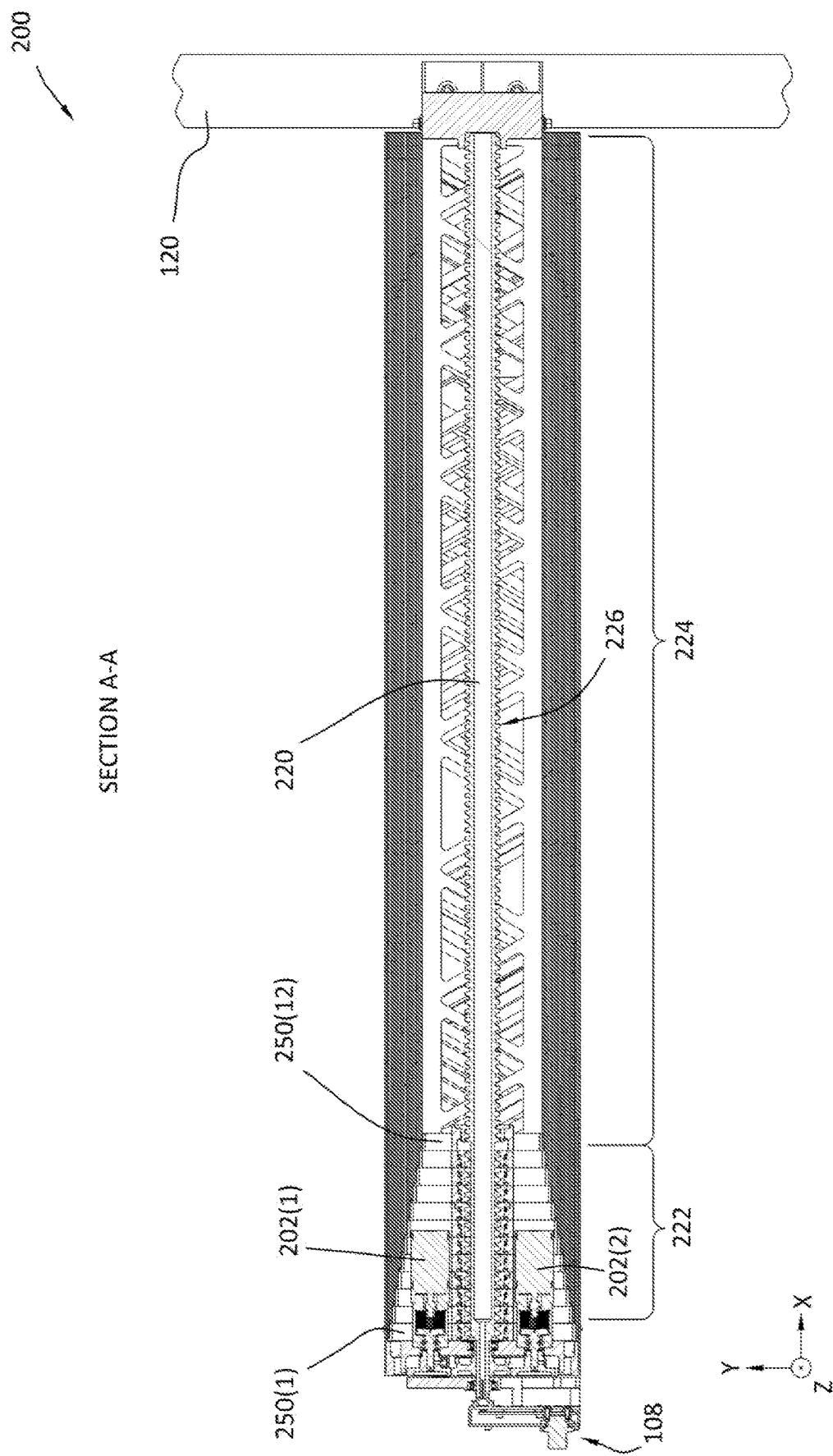
FIG. 2 illustrates a cross section of the extensible boom device in a stowed configuration with motors visible, according to some implementations.

FIG. 2 illustrates a cross section 200 along line A-A of the extensible boom device 102 in a stowed configuration with motors visible, according to some implementations.

One or more motors 202 may be used to provide force to deploy the EBD 102. In the implementation shown, two motors 202(1) and 202(2) are depicted. In other implementations, a single motor 202 or additional motors may be used. To minimize overall volume of the EBD 102, the motors 202 may be arranged within the fixed section 104 as shown here.

Output shafts from the motors 202 drive gears of the gear assembly 108 to rotate a leadscrew 220.

The leadscrew 220 extends along a long axis of the EBD 102 and comprises an unthreaded portion 222 and a threaded portion 224. In some implementations, the leadscrew 220 may be hollow or "gundrilled" to reduce mass. The unthreaded portion 222 is proximate to the gear assembly 108 while the threaded portion 224 is distal from the gear assembly 108. The threaded portion 224 comprises leadscrew threads 226.

Each nested section 106 comprises a support structure 250 that acts as a reaction plate. For example, twelve support structures 250(1)-(12) are depicted. The support structure 250 includes a threaded feature, such as a threaded nut, that engages the leadscrew threads 226 at some time during extension. While engaged with the leadscrew threads 226, the force applied by motion of the leadscrew 220 is transferred via the threaded feature to the support structure 250 and to the nested section 106.

Figure 3:
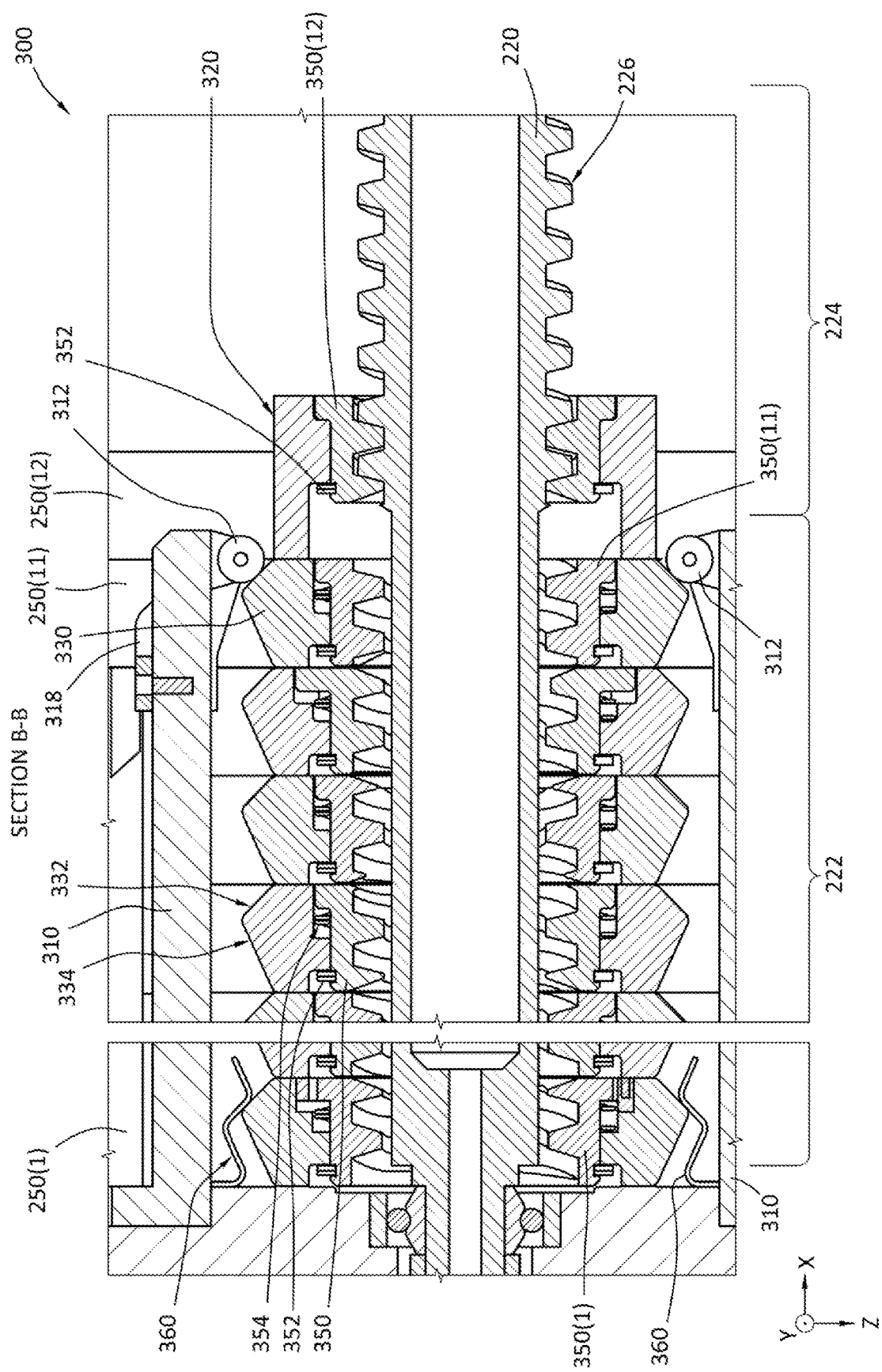
FIG. 3 illustrates an enlarged cross section of a portion of the extensible boom device in the stowed configuration, according to some implementations.

FIG. 3 illustrates at 300 an enlarged cross section along line B-B of a portion of the extensible boom device 102 in the stowed configuration, according to some implementations. Staging during extension is implemented at least in part by the selective engagement of the threaded portions 224 of respective support structures 250 of the nested sections 106 and use of a flexure arm and ramp arrangement to constrain movement of nested sections 106 relative to the fixed section 104 as described next.

The EBD 102 comprises one or more flexure arms 310. Each flexure arm 310 comprises a fixed end and a free end. The fixed end may be affixed to the fixed section 104 or other stationary portion of the EBD 102. The flexure arm 310 is rigid, but does permit some movement of the free end relative to the fixed end. The material composition and shape of the flexure arm 310 may be used to achieve a desired amount of force that is required to deflect the free end. In the implementation shown, the flexure arm 310 may comprise a roller assembly. In other implementations, other arrangements may be used. For example, the flexure arm 310 may comprise a fixed feature, such as a protrusion extending from the flexure arm 310 towards the leadscrew 220. In another example, instead of the flexure arm 310, a fixed structure may support a roller 312 or other feature that is biased, using a spring or other mechanism, towards the leadscrew 220.

The system 100 may include one or more staging sensors 318. The staging sensor 318 may be used to determine the progression of support structures 250 or a portion thereof. For example, the staging sensor 318 may comprise a Hall effect sensor affixed to a bracket mounted to the fixed section 104. The Hall effect sensor may be used to detect magnets that are affixed to the distal end of the flexure arm 310. In this implementation, the staging sensor 318 provides output indicative of displacement of the flexure arm 310 resulting from interaction of the roller 312 with the ramp profile(s) 330 of the support structures 250. In other implementations other sensors may be used. For example, the staging sensor 318 may comprise an inductive sensor, an optical sensor, a strain gauge affixed to the flexure arm 310, and so forth. In other implementations, the staging sensor 318 may be located in other positions with respect to the EBD 102.

Each support structure 250 comprises a profile as shown in this cross section. The nested section 106(12) that is first extended has a support structure 250(12) with a flat profile 320. The roller 312 or other portion of the flexure arm 310 may come in contact with a portion of the flat profile 320 of the support structure 250(12).

The subsequently deployed support structures 250(11)-(1) include a ramp profile 330. The ramp profile 330 may comprise a leading ramp face 332 and a lagging ramp face 334. The leading ramp face 332 comprises the portion of the ramp that is distal to the gear assembly 108 while the lagging ramp face 334 is proximate to the gear assembly 108.

The ramp profile 330 may be asymmetrical with respect to the cross section shown. For example, the leading ramp face 332 may be shorter than the lagging ramp face 334. As the respective ramp profiles 330 move past the roller 312, the flexure arm 310 biases the roller 312 towards the leadscrew 220. Before extension of a nested section 106 with a ramp profile 330, the force applied by the roller 312 on the leading ramp face 332 retains that nested section 106 in place. This keeps the threaded feature of the support structure 250 of this nested section 106 proximate to the unthreaded portion 222 of the leadscrew 220, preventing engagement with the leadscrew threads 226.

As the nested section 106 is pulled outward with sufficient force, the roller 312 is displaced by the leading ramp face 332, allowing the nested section 106 to move towards extension. Once the roller 312 passes the crest of the ramp profile 330 and is in contact with the lagging ramp face 334, the force from the flexure arm 310 as transferred by the roller 312 urges the support structure 250 and the attached nested section 106 towards the threaded portion 224 of the leadscrew 220. This aids in the threaded feature of the support structure 250 in engaging the leadscrew threads 226.

In some implementations, the ramp profiles 330 may differ between support structures 250. For example, the ramp profiles 330 may successively increase in crest height or decrease in crest height with successive support structures 250(11)-(1). The ramps may be planar, as shown, curved, and so forth.

Each of the support structures 250 comprises a threaded feature that is configured to engage the leadscrew threads 226 of the threaded portion 224 of the leadscrew 220. In the implementation depicted here, the threaded feature comprises a threaded nut 350 comprising a threaded hole. The nut 350 is configured to engage the leadscrew threads 226 of the leadscrew 220. In other implementations, the threaded feature may comprise threads within the support structure 250 itself, such as a threaded hole in the support structure 250. For example, the threaded feature may comprise threads that have been formed or cut within the support structure 250.

In the implementation depicted here, the first nested section 106 that is extended, that is nested section 106(12) in this illustration, comprises a nut 350(12) that is retained by a retention clip 352. Before extension, the nut 350(12) engages the leadscrew threads 226 of the threaded portion 224 of the leadscrew 220. Before extension, the nuts 350 (11)-(1) or other threaded features of the remaining nested sections 106(11)-(1) are proximate to the unthreaded portion 222 of the leadscrew 220 and are not engaged with the threaded portion 224.

The nested sections 106 may comprise a spring or other biasing mechanisms to urge the threaded portion, with respect to the support structure 250, towards the threaded portion 224 of the leadscrew 220. Each of the support structures 250(11)-(1) may comprise a spring 354 that provides a biasing force to the nut 350, urging the nut 350(11)-(1) towards the far end of the leadscrew 220. The spring 354 may comprise a wave spring. The biasing action of the spring 354 may facilitate mechanical engagement between the threads of the nut 350 and the leadscrew threads 226.

A stage clip 360 may engage a portion of the ramp profile 330 of the last-out nested section 106(1). The stage clip 360 may comprise a fixed end attached to the fixed section 104 and a free end that is in contact with one or more of the leading ramp face 332(1) or the lagging ramp face 334(1) of the nested section 106(1). The stage clip 360 assists in maintaining the last-out nested section 106(1) in place until pulled by a preceding nested section 106(2). In implementations with the pawl and ratchet mechanism, the stage clip 360 prevents premature engagement of the pawl.

During extension, the motor 202 rotates the leadscrew 220. The nested section 106(12), having a nut 350 that is engaged with the leadscrew threads 226 and unimpeded by the roller 312 of the flexure arm 310, extends outward.

As the nested section 106(12) reaches its end of travel, spring-biased section locking pins (See FIG. 6) or other features engage to prevent further relative movement between the nested section 106(12) and the nested section 106(11). The leadscrew 220 continues to rotate, moving the first support structure 250(12) and nut 350(12) outward. The nut 350(11) of the next nested section 106(11) then engages the threaded portion 224 of the leadscrew 220. At this time, two nested sections 106 may engage the threaded portion 224 of the leadscrew 220 at the same time. The nut 350(12) then moves beyond the end of the leadscrew 220 and is no longer engaged. Meanwhile, the nut 350(11) continues to be driven outward by the leadscrew 220, pulling the nested section 106(11).

The interaction between the ramp profiles 330 of the support sections 250(11)-(1) facilitates staging by constraining motion of the successive nested sections 106. In the implementation depicted here, because the ramp profile 330 contains bidirectional ramps, as opposed to a ratchet profile, it is possible to reverse extension and retract the nested sections 106 at least until limited by previously engaged section locking pins 650. The ability to retract allows for additional failure mitigation options. For example, in the event of an unexpected binding of the nested section 106 or the load such as the PV panels 152, the nested section 106 may be retracted and then extended in an attempt to free the binding. In another example, if more than one nested section 106 is inadvertently extended, the bidirectional ramp profile 330 allows retraction and re-extension, re-engaging the unintended additional nested section 106 to be retained again.

In this illustration, a second flexure arm 310 is shown opposite the first flexure arm 310. While two flexure arms 310 are depicted, in other implementations fewer or additional flexure arms 310 may be used.

Figure 4:
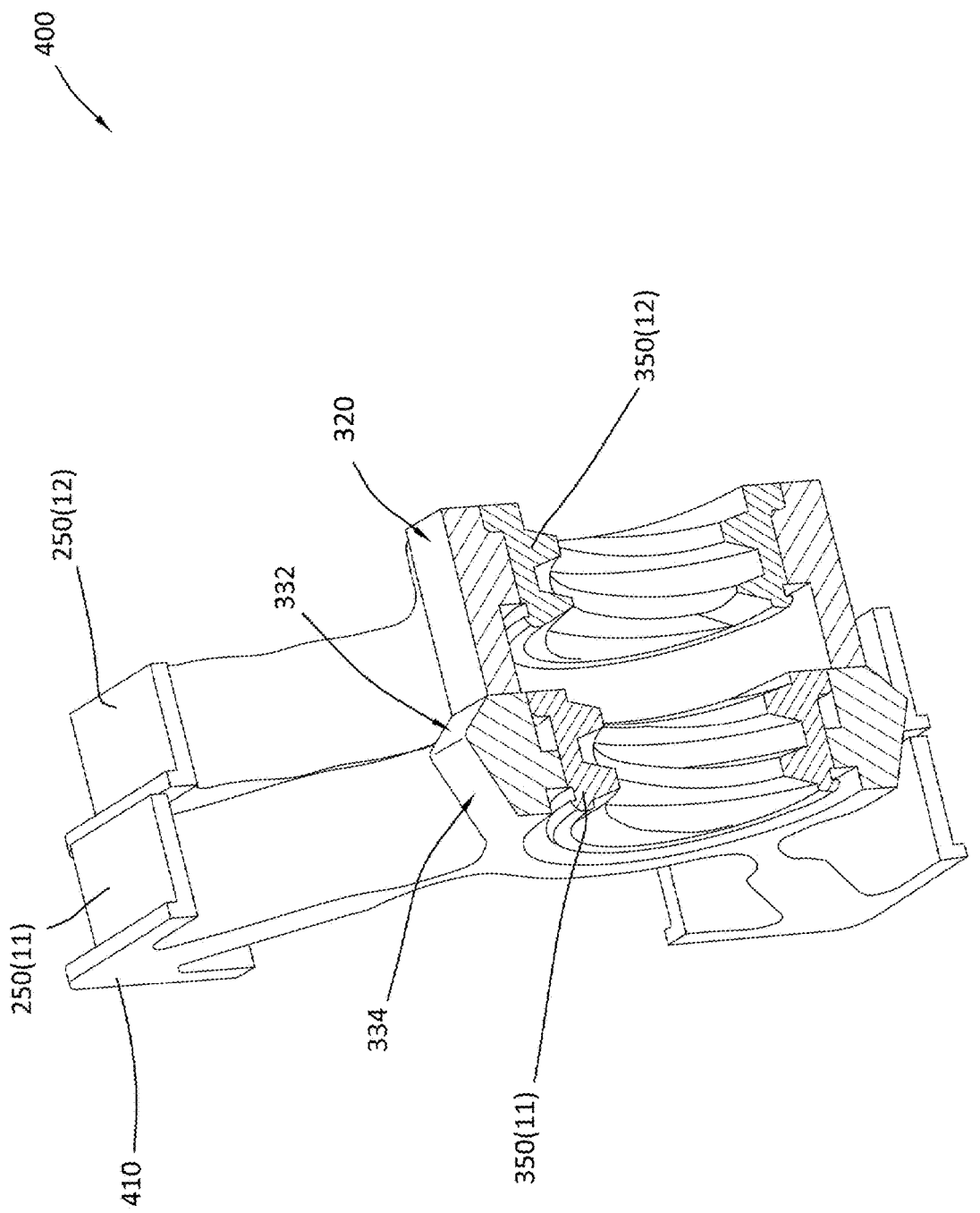
FIG. 4 illustrates an enlarged view of support structures and threaded features, according to some implementations.

FIG. 4 illustrates an enlarged view 400 of support structures 250(12) and 250(11) and threaded features comprising nuts 350(12) and 350(11), respectively, according to some implementations. In this illustration, the flat profile 320 of the support structure 250(12) of the nested section 106(12) is shown. Also visible is the ramp profile 330 of the support structure 250(11) of the nested section 106(11), the ramp profile 330 comprising the leading ramp face 332 and lagging ramp face 334 of the ramp profile 330.

Also shown are support structure corners 410 that are affixed to the remainder of the associated nested sections 106.

Figure 5:
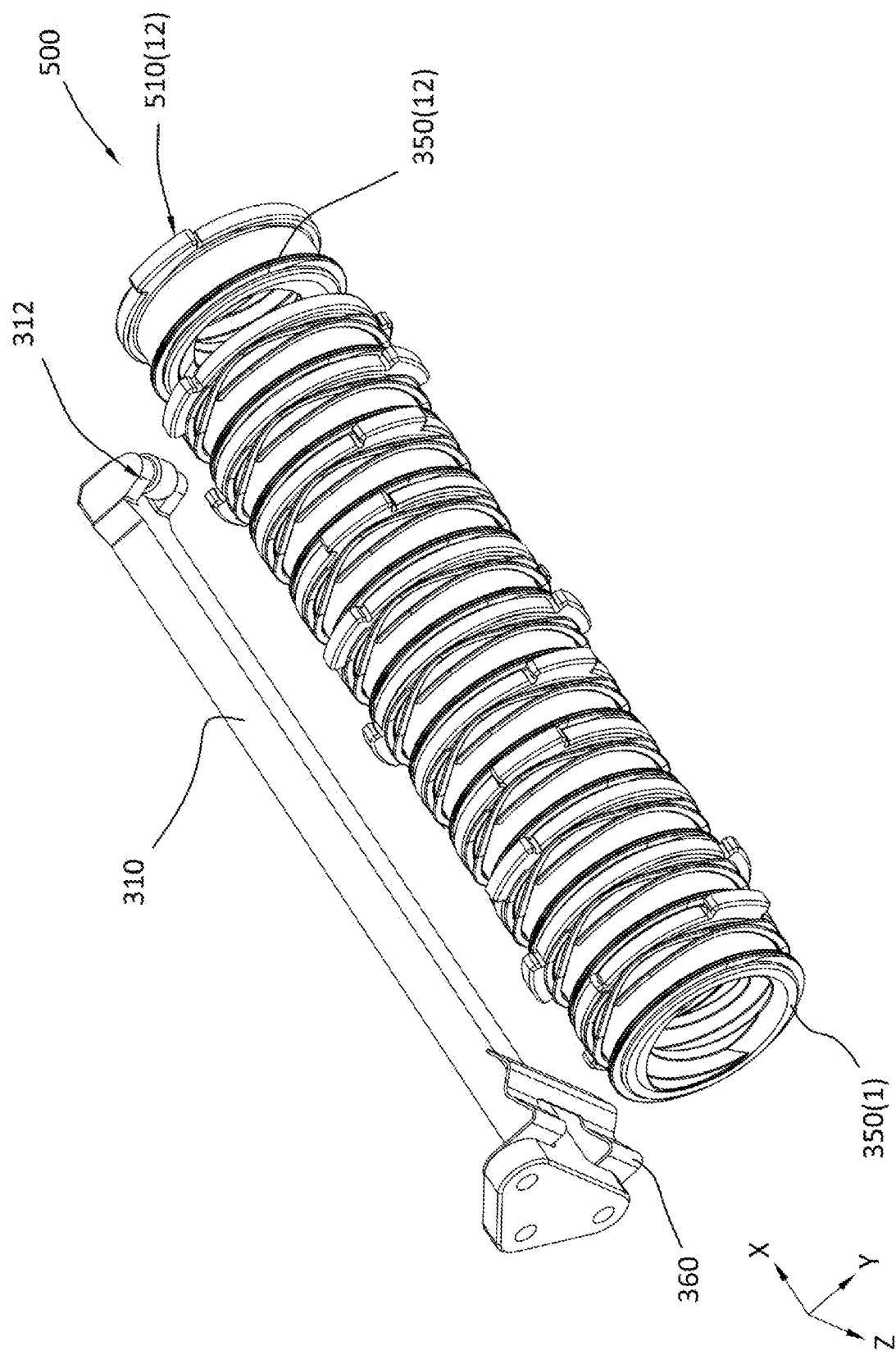
FIG. 5 illustrates the flexure arm and relative offsets of the threaded features, according to some implementations.

FIG. 5 illustrates the flexure arm 310 and relative offsets of the threaded features such as the nuts 350, according to some implementations.

In this view, the flexure arm 310 and the roller 312 is shown. In some implementations, the stage clip 360 may also be affixed to the flexure arm 310 as shown here.

The threaded portions, such as the nuts 350 of the nested sections 106 may be "clocked" or have an angular offset with respect to a lead-in or start of their respective threads. For example, the nested section 106(12) may have a nut 350(12) with threads starting at 12 o'clock, while the nested section 106(11) has a nut 350(11) with threads starting at 2 o'clock, and so forth. This "clocking" or successive angular offset of the thread lead-in of the threaded portion of the nested section 106 facilitates the staged extension. By introducing this angular offset, the threaded portions may engage the leadscrew threads 226 of the leadscrew 220 more easily. The angular offset may also prevent binding when two threaded portions are engaged with the threaded portion 224 at the same time. This angular offset is shown by the angular progression of a nut feature 510 for successive nuts 350 as shown in FIG. 5.

Figure 6:
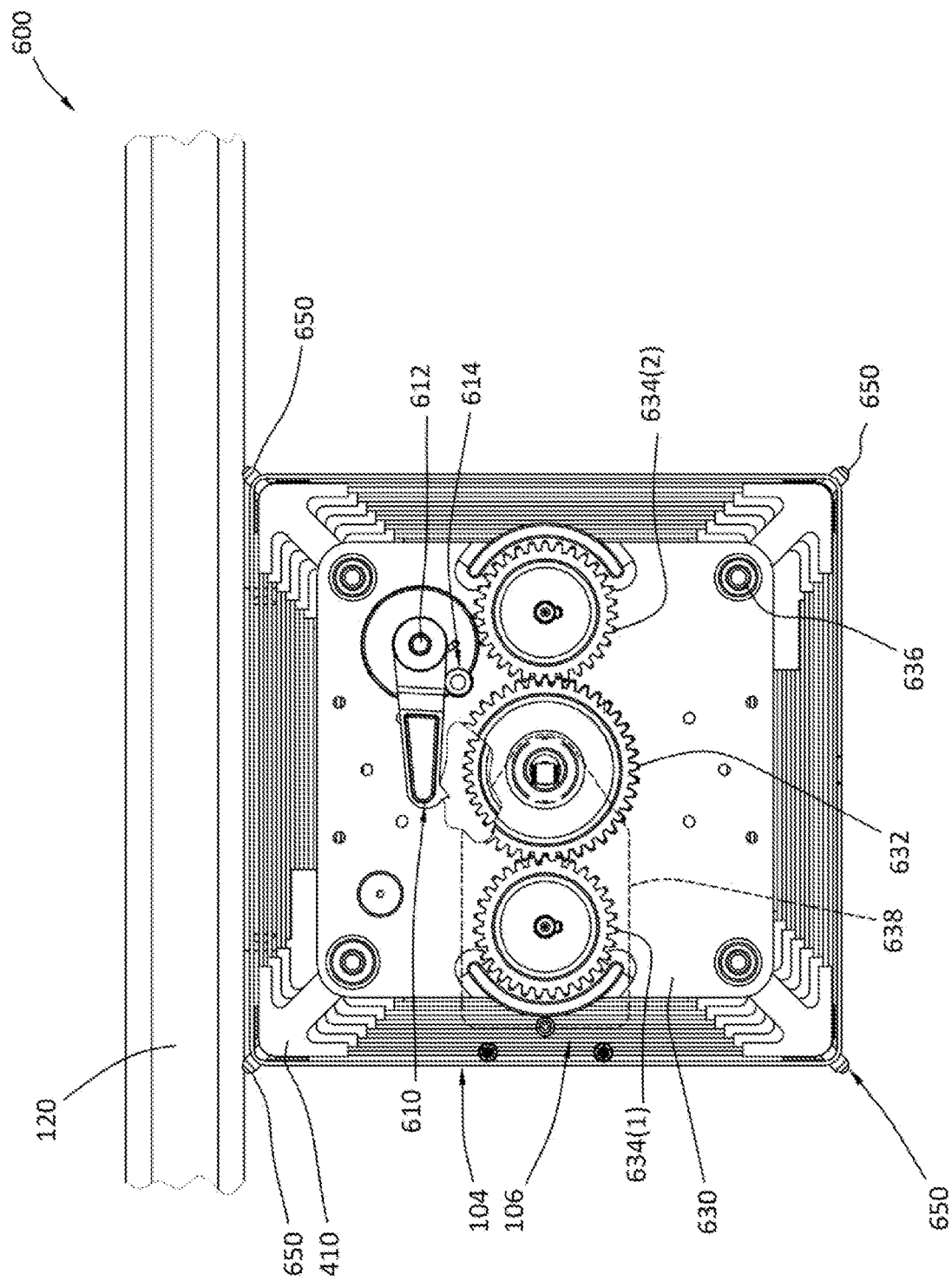
FIG. 6 illustrates a ratchet mechanism that limits rotation after a nested section is extended, according to some implementations.

FIG. 6 illustrates at 600 a ratchet mechanism that limits rotation after a nested section 106 is deployed, according to some implementations. This view depicts a portion of the gear assembly 108.

The gear assembly 108 may comprise a gear plate 630 to which one or more of the following mechanisms may be coupled.

The gear assembly 108 may include a ratchet mechanism. The ratchet mechanism may comprise a pawl 610 that pivots with respect to a pawl pivot 612, and a pawl release pin 614. The pawl release pin 614 may comprise, or be affixed to, a portion of one of the nested sections 106. For example, the pawl release pin 614 may extend from the nested section 106(1) that is last to be extended. Before extension, the pawl release pin 614 restricts the movement of the pawl 610, preventing it from engaging a first gear 632.

The first gear 632 may be mechanically coupled to the leadscrew 220. The first gear 632 may comprise a first set of gear teeth (shown) and a second set of gear teeth (not visible). A second gear 634 is attached to a shaft of the motor 202 and transfers force from the shaft to the first set of gear teeth of the first gear 632. In the implementation shown here, there are two motors 202(1)-(2) (not shown) and two second gears 634(1)-(2) that engage the first set of gear teeth of the first gear 632. In other implementations other gear arrangements may be used. For example, a set of epicyclic gears may be used to drive the leadscrew 220. With the pawl release pin 614 in the position shown in FIG. 6, the pawl 610 does not engage the second set of gear teeth of the first gear 632. As a result, the first gear 632, and thus the leadscrew 220, may be rotated in either direction. As described above, in some situations the nested section(s) 106 may be partially retracted and then extended.

As the nested section 106 to which the pawl release pin 614 is extended, the pawl release pin 614 is displaced, removing the obstruction and allowing the pawl 610 to move to engage the second set of gear teeth of the first gear 632. The second set of gear teeth of the first gear 632 are shown in a cutaway view that omits the first set of gear teeth of the first gear 632. With the pawl 610 engaging the second set of gear teeth of the first gear 632, a ratchet action is produced, permitting rotation in a first direction and preventing rotation in a second direction. The ratchet action may be configured to allow the leadscrew 220 to be rotated to further extend the nested section(s) 106 and prevent retraction. In implementations where the pawl 610 and ratchet mechanism are used, once the pawl release pin 614 is removed, the leadscrew 220 may no longer be reversed, preventing retraction.

While gears are depicted, in some implementations the leadscrew 220 may be directly driven by a motor 202.

One or more mounting holes 636 in the gear plate 630 are also shown. These mounting holes 636 may be used in conjunction with mechanical fasteners to join the gear plate 630 to the fixed section 104.

An outline of an encoder assembly 638 is shown. The encoder assembly 638 may comprise a rotation sensor to determine rotation of the leadscrew 220. The encoder assembly may comprise a Hall effect sensor, optical encoder, inductive sensor, and so forth. The encoder assembly 638 may provide data indicative of angle of the leadscrew 220 relative to a reference direction.

Also shown in this figure are section locking pins 650 that are proximate to the support structure corners 410. Each of the four corners of the nested sections 106 may have an associated spring-biased section locking pin 650. As the section locking pin 650 encounters an aperture in the next-outermost section, the section locking pin 650 engages, and prevents further relative movement between the sections. In other implementations other mechanisms may be used. For example, a ridged living hinge may be arranged around the outer perimeter of a nested section 106. Once unrestrained by the surrounding section, the ridge may extend and prevent relative motion between the section.

Figure 7:
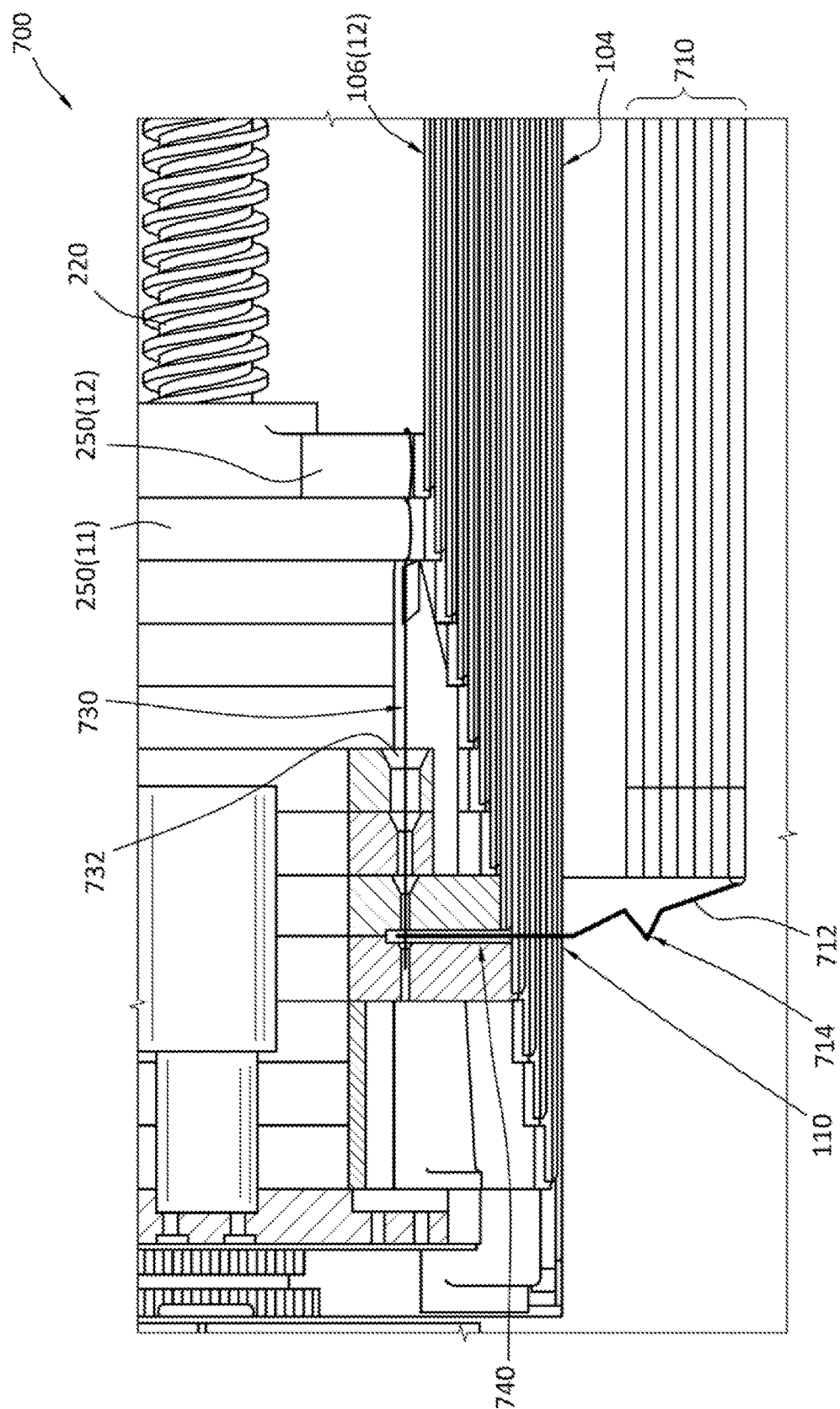
FIG. 7 is an enlarged cross section showing a retention clip and retention clip release, according to some implementations.

FIG. 7 is an enlarged cross section 700 showing a retention clip and retention clip release in a stowed configuration, according to some implementations. In implementations where the EBD 102 is used to deploy a load having a plurality of panels, such as PV panels 152, it may be advantageous to control the relative movement of some of the individual panels.

In the implementation depicted here, a plurality of PV panels 152 are shown at 710 in a stacked configuration. A load retention clip 712 has a first end that is affixed to at least a portion of the plurality of PV panels 152. A portion of the load retention clip 712, while the PV panels 152 are stowed, passes through the load retention clip aperture 110 and channel 740 through intervening structures, such as gaps in the trusses of the nested sections 106. The load retention clip 712 may include a spring portion 714 that provides tension to retain the portion of the plurality of PV panels 152. A second end of the load retention clip 712 is retained in the stowed configuration by a load retention clip release pin 730. One end of the load retention clip release pin 730 is affixed to a portion of one of the nested sections 106. For example, the load retention clip release pin 730 may be affixed to the support structure 250(12) of the nested sections 106(12). The load retention clip release pin 730 passes through a channel 732 or other aperture in one or more of the support sections 250, until reaching the load retention clip 712.

By withdrawing the load retention clip release pin 730, the second end of the load retention clip 730 is released, and the load retention clip 712 no longer restrains the portion of the plurality of PV panels 152. While a single load retention clip 712 is depicted, in other implementations a plurality of load retention clips 712 may be used. In some implementations, different load retention clips 712 may be associated with different nested sections 106 to provide staged control over deployment of the load, such as the PV panels 152.

Figure 8:
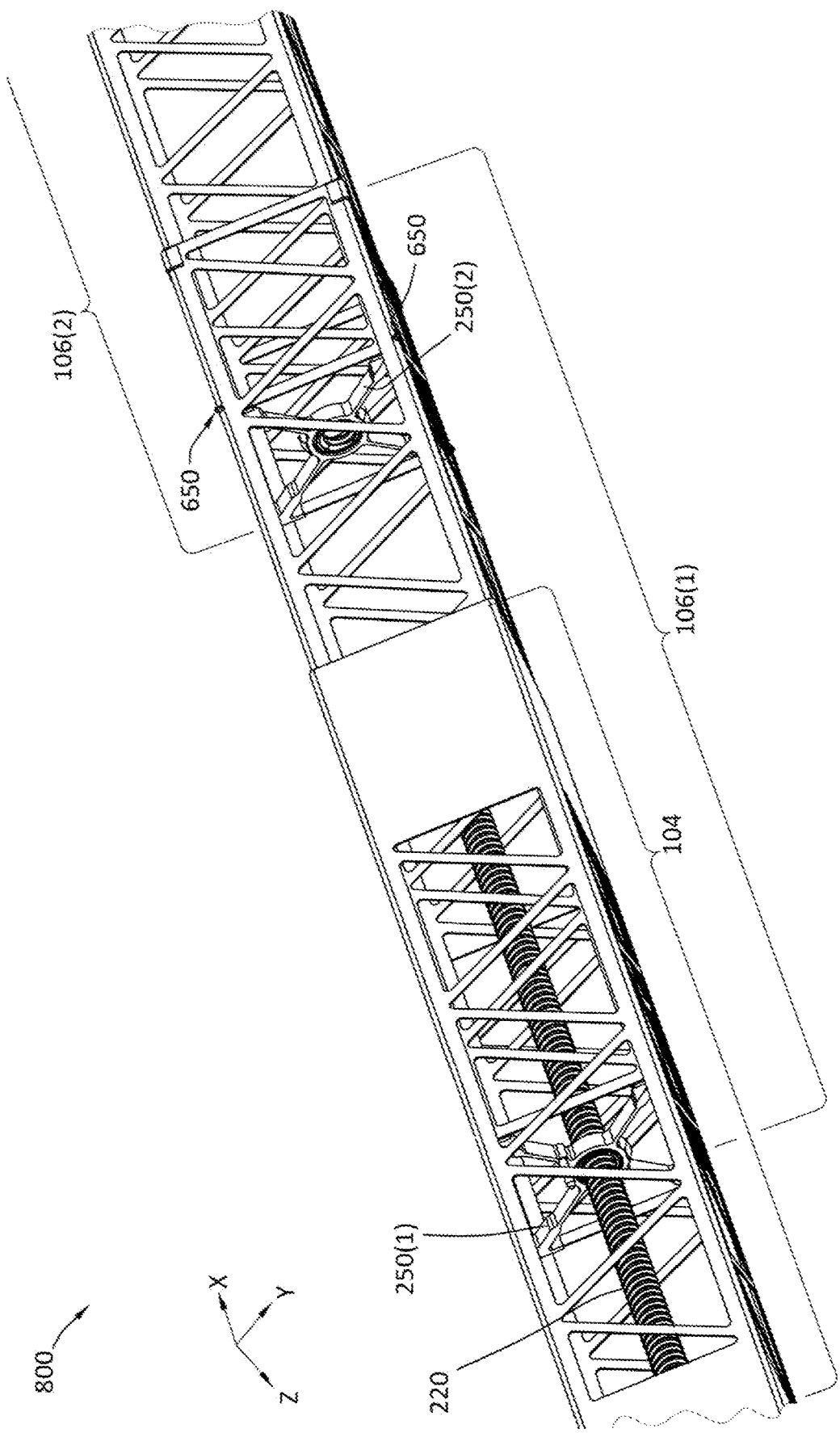
FIG. 8 depicts a portion of the extended configuration of the extensible boom device, according to some implementations.

FIG. 8 depicts a portion 800 of the extended configuration of the extensible boom device 102, according to some implementations. Shown in this illustration is the fixed section 104, the first nested section 106(1), and a portion of the second nested section 106(2).

In the extended configuration, the section locking pins 650 prevent movement between adjacent nested sections 106. For example, the section locking pins 650 are shown that extend from the second nested section 106(2) and have mechanically engaged corresponding apertures in the first nested section 106(1). The support structure 250(2) of the second nested section 106(2) and its corresponding threaded feature such as the nut 350(2) is no longer engaged with the leadscrew 220. The nut 350(1) of the support structure 250(1) of the first nested section 106(1) remains engaged to the threaded portion 224 of the leadscrew 220. This allows subsequent adjustments of the tension on a load, such as the PV panels 152 that may be arranged between the load arm 120 at a far end of the boom and the fixed section 104 or the spacecraft 150 frame to which the fixed section 104 is attached. For example, at a later time, the motor(s) 202 may be operated to rotate the leadscrew 220, moving the first support section 250(1) away from the gear assembly 108.

In the implementation shown here, no section locking pins 650 are present between the first nested section 106(1) and the fixed section 104. In some implementations, section locking pins 650 may be present between the first nested section 106(1) and the fixed section 104. To provide for additional adjustment in tension, the section locking pins 650 in this implementation may extend into respective slots of the fixed section 104 that allow for linear motion of the first nested section 106(1) with respect to the fixed section 104.

In implementations where the pawl 610 and ratchet mechanism are not present, the motor 202 may be operated to reduce tension. By modifying the tension exerted on the load, the boom, or both, the fundamental frequency of the structure(s) may be adjusted. For example, increasing the tension may increase the fundamental frequency, while decreasing the tension may decrease the fundamental frequency.

In some implementations, the modification of the tension may be used to damp spacecraft 150 vibration. For example, the EBD 102 may be operated to provide a tension that results in a non-resonant frequency to provide vibration damping.

Figure 9:
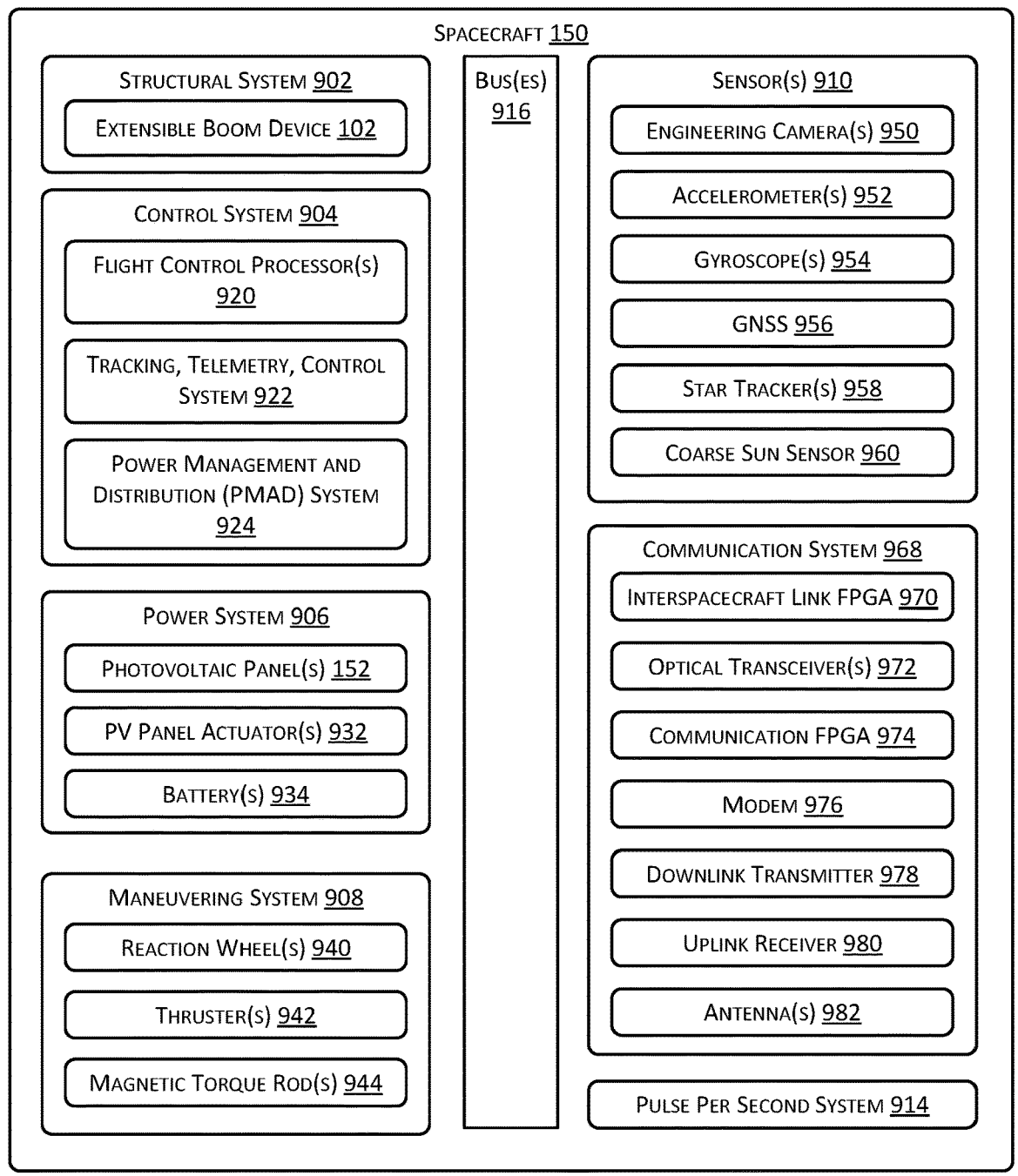
FIG. 9 is a block diagram of some systems associated with a spacecraft that may utilize the extensible boom device, according to some implementations.

FIG. 9 is a block diagram 900 of some systems associated with the spacecraft 150, according to some implementations. The spacecraft 150 may comprise a structural system 902, a control system 904, a power system 906, a maneuvering system 908, one or more sensors 910, and a communication system 968. A pulse per second (PPS) system 914 may be used to provide timing reference to the systems onboard the spacecraft 150. One or more buses 916 may be used to transfer data between the systems onboard the spacecraft 150. In some implementations, redundant buses 916 may be provided. The buses 916 may include, but are not limited to, data buses such as Controller Area Network Flexible Data Rate (CAN FD), Ethernet, Serial Peripheral Interface (SPI), and so forth. In some implementations the buses 916 may carry other signals. For example, a radio frequency bus may comprise coaxial cable, waveguides, and so forth to transfer radio signals from one part of the spacecraft 150 to another. In other implementations, some systems may be omitted or other systems added. One or more of these systems may be communicatively coupled with one another in various combinations.

The structural system 902 comprises one or more structural elements to support operation of the spacecraft 150. For example, the structural system 902 may include trusses, struts, panels, the extensible boom device 102, and so forth. The components of other systems may be affixed to, or housed by, the structural system 902. For example, the structural system 902 may provide mechanical mounting and support for the extensible boom device 102 that is in turn used to support the photovoltaic panel(s) 152 in the power system 906. The structural system 902 may also provide for thermal control to maintain components of the spacecraft 150 within operational temperature ranges. For example, the structural system 902 may include louvers, heat sinks, radiators, and so forth.

The control system 904 provides various services, such as operating the onboard systems, resource management, providing telemetry, processing commands, and so forth. For example, the control system 904 may direct operation of the communication system 968. The control system 904 may include one or more flight control processors 920. The flight control processors 920 may comprise one or more processors, FPGAs, and so forth. A tracking, telemetry, and control (TTC) system 922 may include one or more processors, radios, and so forth. For example, the TTC system 922 may comprise a dedicated radio transmitter and receiver to receive commands from a ground station, send telemetry to the ground station, and so forth. A power management and distribution (PMAD) system 924 may direct operation of the power system 906, control distribution of power to the systems of the spacecraft 150, control battery 934 charging, and so forth.

The power system 906 provides electrical power for operation of the components onboard the spacecraft 150. The power system 906 may include components to generate electrical energy. For example, the power system 906 may comprise one or more photovoltaic panels 152 comprising a plurality of photovoltaic cells, thermoelectric devices, fuel cells, and so forth. One or more photovoltaic (PV) panel actuators 932 may be used to change the orientation of the photovoltaic panel(s) 152 relative to the spacecraft 150. For example, the PV panel actuator 932 may comprise a motor. The power system 906 may include components to store electrical energy. For example, the power system 906 may comprise one or more batteries 934, fuel cells, and so forth.

The maneuvering system 908 maintains the spacecraft 150 in one or more of a specified orientation or orbit. For example, the maneuvering system 908 may stabilize the spacecraft 150 with respect to one or more axes. In another example, the maneuvering system 908 may move the spacecraft 150 to a specified orbit. The maneuvering system 908 may include one or more of reaction wheel(s) 940, thrusters 942, magnetic torque rods 944, solar sails, drag devices, and so forth. The thrusters 942 may include, but are not limited to, cold gas thrusters, hypergolic thrusters, solid-fuel thrusters, ion thrusters, arcjet thrusters, electrothermal thrusters, and so forth. During operation, the thrusters 942 may expend propellent. For example, an electrothermal thruster may use water as propellent, using electrical power obtained from the power system 906 to expel the water and produce thrust. During operation, the maneuvering system 908 may use data obtained from one or more of the sensors 910.

The spacecraft 150 includes one or more sensors 910. The sensors 910 may include one or more engineering cameras 950. For example, an engineering camera 950 may be mounted on the spacecraft 150 to provide images of at least a portion of the photovoltaic panels 152. Accelerometers 952 provide information about acceleration of the spacecraft 150 along one or more axes. Gyroscopes 954 provide information about rotation of the spacecraft 150 with respect to one or more axes. The sensors 910 may include a global navigation spacecraft system (GNSS) 956 receiver, such as a Global Positioning System (GPS) receiver, to provide information about the position of the spacecraft 150 relative to Earth. In some implementations, the GNSS 956 may also provide information indicative of velocity, orientation, and so forth. One or more star trackers 958 may be used to determine an orientation of the spacecraft 150. A coarse sun sensor 960 may be used to detect the sun, provide information on the relative position of the sun with respect to the spacecraft 150, and so forth. The spacecraft 150 may include other sensors 910 as well. For example, the spacecraft 150 may include a horizon detector, radar, lidar, and so forth.

The communication system 968 provides communication with one or more other devices, such as other spacecraft 150, ground stations, user terminals, and so forth. The communication system 968 may include one or more modems 976, digital signal processors, power amplifiers, antennas 982 (including at least one antenna 982 that implements multiple antenna elements, such as a phased array antenna), lasers, telescopes, photodetectors, processors, memories, storage devices, communications peripherals, interface buses, and so forth. Such components support communications with other spacecraft 150, ground stations, user terminals (UTs), and so forth using various wavelengths. The communications may involve multiplexing, encoding, and compressing data to be transmitted, modulating the data to a desired frequency, and amplifying it for transmission. The communications may also involve demodulating received signals and performing any necessary de-multiplexing, decoding, decompressing, error correction, and formatting of the signals. Data decoded by the communication system 968 may be output to other systems, such as to the control system 904, for further processing. Output from a system, such as the control system 904, may be provided to the communication system 968 for transmission.

The communication system 968 may include one or more optical transceivers 972. The optical transceiver 972 uses optical wavelengths such as infrared light, visible light, ultraviolet light, and so forth for communication. The optical transceiver 972 may include an optical detector system and one or more of an optical receiver system or an optical transmitter system. The optical detector system provides information about a relative alignment of incoming light. This information may then be used to adjust actuators that direct the incoming light into a desired alignment. For example, the optical detector system may determine a distance and direction that the incoming light transmitted by an optical transmitter system from the second spacecraft 150(2) is off center. One or more actuators may be operated responsive to this information to center the incoming light. Output from the optical detector system may be part of a feedback loop that attempts to track the incoming light and maintain a desired alignment of the incoming light. For example, tracking keeps a beam of incoming light centered on an optical fiber that directs the incoming light to a photodetector that is then used to detect changes in the incoming light that are used to send data.

The communication system 968 may include hardware to support the interspacecraft link. For example, an interspacecraft link FPGA 970 may be used to modulate data that is sent and received by the optical transceiver 972 to send data between spacecraft 150.

A communication FPGA 974 may be used to facilitate communication between the spacecraft 150 and the ground stations, UTs, and so forth. For example, the communication FPGA 974 may direct operation of a modem 976 to modulate signals sent using a downlink transmitter 978 and demodulate signals received using an uplink receiver 980. The downlink transmitter(s) 978 and uplink receiver(s) 980 may be implemented as a transceiver. The transceiver may be connected to one or more antennas 982. The spacecraft 150 may include one or more antennas 982. For example, one or more parabolic antennas may be used to provide communication between the spacecraft 150 and one or more ground stations. In another example, a phased array antenna may be used to provide communication between the spacecraft 150 and the UTs.

The phased array antenna contains many elements and uses slight differences in timing or phase of the signals to produce a beamforming effect that directs a signal to transmit or receive in a particular direction relative to the phased array antenna. For example, a phased array antenna system may include antenna control electronics controlling a radio frequency (RF) feeding network. The RF feeding network may include a plurality of signal conditioning components interposed between antenna elements and the transceivers. The signal conditioning components introduce one or more of a phase modulation or an amplitude modulation to the signal sent to the antenna elements. This introduces a progressive phase modulation and produces interference in the individual transmission of each antenna element, producing directivity or gain in a particular direction. The phase modulation imposed on each antenna element will differ and will be dependent on a spatial location of a communication target that determines an optimum beam vector (e.g., where the beam vector is found by one or more of maximizing signal intensity or connection strength). The optimum beam vector may change with time, such as when a communication target moves relative to the phased array antenna system.

The circuitry, processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

The spacecraft 150 or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form).

Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
    a fixed section having a first long axis, a first end, and a second end;
    a first motor proximate to the first end of the fixed section;
    a leadscrew having a second long axis parallel to the first long axis, wherein the leadscrew is driven by the first motor, and the leadscrew comprises:
        a first unthreaded portion proximate to the first end, and
        a first threaded portion;
    a first flexure arm comprising:
        a third end proximate to the first end, wherein the third end is fixed,
        a fourth end distal to the third end, wherein the fourth end is moveable relative to the third end, and
        a first roller that is proximate to the fourth end;
    a first nested section that is at least partially within the fixed section, the first nested section comprising:
        a first support structure comprising a first ramp face proximate to the first end and a second ramp face proximate to the second end, wherein the first roller is in contact with the second ramp face before extension of the first nested section; and
        a first threaded feature; and
    a second nested section that is at least partially within the first nested section, the second nested section comprising:
        a second support structure; and
        a second threaded feature, wherein the second threaded feature is engaged with the leadscrew.

2. The device of claim 1, wherein the first ramp face has a first length, the second ramp face has a second length, and the first length is less than or equal to the second length.

3. The device of claim 1, further comprising:
    a first spring to bias, with respect to the first support structure, the first threaded feature toward the second end.

4. The device of claim 1, wherein the first motor is within the fixed section; and
    further comprising:
        a leadscrew rotation sensor to determine rotation of the leadscrew; and
        a staging sensor to determine movement of the first nested section with respect to the fixed section.

5. The device of claim 1, further comprising:
    a plurality of photovoltaic panels;
    a retention clip comprising:
        a first end affixed to at least a portion of the plurality of photovoltaic panels, and
        a second end; and
    a retention clip release pin mechanically coupled to the second nested section, wherein the retention clip release pin retains the second end of the retention clip before extension of the second nested section.

6. The device of claim 1, further comprising:
    a second motor within the fixed section.

7. A device supporting a portion of a spacecraft, the device comprising:
    a fixed section having a first end and a second end;
    a motor;
    a leadscrew driven by the motor;
    a first flexure arm comprising:
        a third end proximate to the first end, and
        a fourth end distal to the third end;
    a first nested section comprising:
        a first support structure comprising a first ramp face proximate to the first end and a second ramp face proximate to the second end, wherein the fourth end is in contact with the second ramp face before extension of the first nested section; and
        a first threaded feature, wherein the first threaded feature is not engaged with the leadscrew; and
    a second nested section comprising:
        a second support structure; and
        a second threaded feature, wherein the second threaded feature is engaged with the leadscrew.

8. The device of claim 7, wherein:
    the first threaded feature comprises a first thread having a first lead-in at a first angle relative to the fixed section; and
    the second threaded feature comprises a second thread having a second lead-in at a second angle relative to the fixed section.

9. The device of claim 7, wherein the fourth end of the first flexure arm that is in contact with the first support structure comprises a roller.

10. The device of claim 7, further comprising:
    a first spring clip having a first portion that is mechanically engaged to the fixed section, wherein a second portion of the first spring clip engages one or more of the first ramp face or the second ramp face.

11. The device of claim 7, further comprising:
    a plurality of panels coupled to the second nested section;
    a retention clip comprising:
        a fifth end affixed to at least a portion of the plurality of panels, and
        a sixth end; and
    a retention clip release pin mechanically coupled to the second nested section, wherein the retention clip release pin retains the sixth end of the retention clip before extension of the second nested section.

12. The device of claim 7, wherein the first ramp face is asymmetrical with respect to the second ramp face.

13. The device of claim 7, further comprising:
a first spring to bias, with respect to the first support structure, the first threaded feature toward the second end.

14. The device of claim 7, further comprising:
a leadscrew rotation sensor to determine rotation of the leadscrew; and
a staging sensor to determine movement of the second nested section with respect to the fixed section.

15. The device of claim 7, wherein:
the motor is proximate to the first end of the fixed section.

16. A device supporting a portion of a spacecraft, the device comprising:
a fixed section having a first end and a second end;
a motor;
a leadscrew comprising a threaded portion and an unthreaded portion, wherein the leadscrew is driven by the motor;
a first arm comprising a third end proximate to the first end and a fourth end distal to the third end;
a first nested section comprising:
a first support structure comprising a first ramp that is in contact with the fourth end before extension of the first nested section, and
a first threaded feature that is proximate to the unthreaded portion before extension; and
a second nested section comprising:
a second support structure; and
a second threaded feature that is engaged with the threaded portion before extension.

17. The device of claim 16, further comprising:
a first spring to bias, with respect to the first support structure, the first threaded feature toward the second end;
wherein the fourth end comprises a roller; and
wherein the first ramp comprises a first face having a first length and a second face having a second length that is greater than or equal to the first length.

18. The device of claim 16, further comprising:
a plurality of photovoltaic panels;
a retention clip comprising:
a fifth end affixed to at least a portion of the plurality of photovoltaic panels, and
a sixth end; and
a retention clip release pin mechanically coupled to the second nested section, wherein the retention clip release pin retains the sixth end of the retention clip before extension of the second nested section.

19. The device of claim 16, wherein:
the first threaded feature comprises a first thread having a first lead-in at a first angle relative to the fixed section; and
the second threaded feature comprises a second thread having a second lead-in at a second angle relative to the fixed section.

20. The device of claim 16, wherein:
the motor is within the fixed section.

\* \* \* \* \*